(12) United States Patent
Park

(10) Patent No.: US 6,843,000 B1
(45) Date of Patent: Jan. 18, 2005

(54) SHOE OUTER SOLE, METHOD FOR ITS MANUFACTURE, AND MOLD THEREFOR

(76) Inventor: Young Soul Park, Backjo Green Apartment 1309, #1248-7, Kupo-dong, Buk-ku, Pusan (KR)

( * ) Notice: Subject to any disclaimer, the term of this patent is extended or adjusted under 35 U.S.C. 154(b) by 0 days.

(21) Appl. No.: 09/582,670
(22) PCT Filed: Dec. 29, 1998
(86) PCT No.: PCT/KR98/00482
§ 371 (c)(1), (2), (4) Date: Jun. 29, 2000
(87) PCT Pub. No.: WO99/33368
PCT Pub. Date: Jul. 8, 1999

(30) Foreign Application Priority Data

| Dec. 31, 1997 | (KR) | 97-82345 |
| May 18, 1998 | (KR) | 98-17880 |
| Jul. 7, 1998 | (KR) | 98-27375 |
| Jul. 7, 1998 | (KR) | 98-27376 |

(51) Int. Cl.[7] .................................................. A43B 13/20
(52) U.S. Cl. .................................... 36/29; 36/27; 36/28
(58) Field of Search ................................... 36/27, 28, 29

(56) References Cited

U.S. PATENT DOCUMENTS

| 3,087,262 A | * | 4/1963 | Russell | 36/28 |
| 4,445,284 A | * | 5/1984 | Sakutori | 36/28 |
| 4,638,577 A | * | 1/1987 | Riggs | 36/28 |
| 4,753,021 A | * | 6/1988 | Cohen | 36/28 |
| 4,754,559 A | * | 7/1988 | Cohen | 36/28 |
| 4,881,329 A | * | 11/1989 | Crowley | 36/27 |
| 5,461,800 A | * | 10/1995 | Luthi et al. | 36/28 |
| 5,577,334 A | * | 11/1996 | Park | 36/28 |
| 5,822,886 A | * | 10/1998 | Luthi et al. | 36/28 |

* cited by examiner

Primary Examiner—Ted Kavanaugh
(74) Attorney, Agent, or Firm—Jordan and Hamburg LLP

(57) ABSTRACT

Outer sole for shoe has midsole formed from two conjoined midsole pieces, and bottom outsole piece. At least midsole pieces are formed by injection molding. Midsole has plurality of through holes therein to provide cushioning capability. Certain embodiments include elements for maintaining and restoring cushioning capability of through holes when subjected to compressive, deforming forces. Through holes vary in size, shape, and pattern of arrangement to provide different cushioning capabilities.

31 Claims, 20 Drawing Sheets

SHOE OUTER SOLE, METHOD FOR ITS MANUFACTURE, AND MOLD THEREFOR

BACKGROUND OF THE INVENTION

1. Field of the Invention

The present invention relates to the outer soles of sports shoes, having through-holes passing through a lateral surface of the sole, a method for their manufacture, and an apparatus for their molding, More particularly, the present invention relates to the outer sole of sports shoes wherein by forming the through holes so as to extend through a lateral surface in the side direction of the midsole, as well as by reducing the weight of the shoes, it is possible not only to increase the cushioning effect of the shoes, without using air cushions, but also to have the desirable effect of insulating the wearer's feet, since the through-holes serve to separate the foot from the ground while the shoes are being worn.

2. Discussion of Related Art

It is well-known that it is desirable to make conventional outer soles of sports shoes lightweight and, in order to make them comfortable and provide a cushioning effect, an air cushion is used in the manufacture of the midsole of the shoe. In manufacturing such outer soles, however, additional work is necessarily required in order to provide an additional air cushion on the mold in which a midsole is formed, and also since these air cushions require additional work prior to assembly of the soles to inflate the cushions with air or gas, it has caused an increase of the manufacturing cost as well as an increase in the defective rate of goods and it has a drawback in that the shoes lose their function as sport shoes if the air cushion deflates after wearing the shoes.

Currently, as a way of manufacturing the midsole in the outer sole of sports shoes, it has been used that since it is formed at the state that the midsole is placed horizontally, it is molded in a shooting method normally by raising it onto upside and inserting resin, which is used to be shot, to the mold of molding consisting of the 2nd or 3rd stage and heating it up to a fixed temperature.

Accordingly, a structure of a mold for the manufacture of shoe outer soles, as shown in FIG. 9, has been used as a way of manufacturing the outer sole of sports shoes that the middle stage mold 200, which is positioned adjacently upwardly from the lower stage mold 100 and the higher stage mold 300 in which a protrusion 600 is formed, are raised sequentially upwardly.

Also, in order to increase the cushioning force as well as to reduce the weight of shoes today, as shown in FIG. 9, the molding operation is performed by injection molding, wherein a protruding pin 400 is formed so that an air cushion may be placed in the side partition of the mold and then attaching the air cushion by inserting an air cushion between the side partition of the mold and a protruding pin 400, or an air cushion is mounted on the midsole, which is molded, by mounting the air cushion into an inserting tube 500 which is first formed.

There is, however, a drawback in that, since additional air or gases are not inserted into an air cushion, and in the case that the air cushion is deflated, the cushioning function of the shoes is significantly reduced.

Another drawback is that these kinds of air cushions are costly and expensive due to the cost increase since the air cushions must be specially made for this purpose.

SUMMARY OF THE INVENTION

Accordingly, in order to overcome such drawbacks in the conventional art, it is therefore an object of the present invention to provide an outer sole for sports shoes, in which through-holes, which pass through a lateral surface, are formed on a lateral surface of the midsole of the shoes, which have an outsole, or bottom sole, and a midsole, so that the weight of the shoe is reduced and its cushioning effect is increased by the through-holes, and the cushioning effect is maintained by a partition, which is created between adjacent through-holes, and which plays a roll as a reinforcing support.

It is another object of the present invention to provide a midsole for sports shoes, in which the through-holes are formed in the lateral direction of the midsole by bisecting the midsole at the location that the midsole mold is erected on a lateral surface, molding the respective midsole pieces, glueing them together, and then glueing the upper midsole thereto in order to form the through-holes.

It is another object of the present invention to provide a manufacturing method in which the midsole is formed integrally and monolithically even where the manufacturing mold for the lower part of the midsole is made in two parts, including a fixed mold piece and a movable mold piece, such that only the movable mold for of a side of the lower midsole can be separated in order to manufacture the midsole integrally, wherein the through-holes are formed in the lateral direction by not molding at the location that the midsole is erected but molding at a horizontal location.

It is another object of the present invention to provide a manufacturing method which can be implemented without creating a seam line on the outer sole, by raising the mold at the location where only middle stage mold, of a three stage manufacturing mold, is divided into a right and left side, in order not to form the seam lines or in order to form the lines on the midsole, in which the through-holes are formed because the fixed mold is separated from the movable mold in the midsole thus formed.

It is another object of the present invention to provide a midsole for sports shoes, in which an elastic bar or an elastic tube, which is made of flexible material and has good elastic properties in order to increase a cushion-maintaining ability of the through-holes, so that the restoring force of the through-holes is supplemented, is formed on the front or the back of the through-holes.

It is another object of the present invention to provide a midsole for sports shoes, in which the shapes of the through-holes can be made differently according to the shape of the dies for making the through-holes on the molds, so that a variety of designs can be made with each having a different cushioning effect.

It is another object of the present invention to provide a midsole for sports shoes, in which a filler or a reinforcing tube for a stopper is formed in the through-holes, so that the elastic force can be protected.

It is another object to provide a mold which can manufacture midsoles 22 integrally, as a single monolithic piece.

To achieve these and other advantages and in accordance with the purpose of the present invention, as embodied and broadly described, there is provided a method of manufacturing the outer sole of sports shoes, in which the through-holes are formed, comprising the steps of forming the midsole so as to be cut and bisected, joining the cut surface after this, and joining the midsole by covering the entire lower surface of the midsole after this.

According to another aspect of the present invention, there is also provided the outer sole of a shoe, in which the through-holes are passing through the front edge and the back edge in the side direction of midsole formed in a shooting mold.

According to another aspect of the present invention, there is also provided a mold for forming the midsole, wherein the mold includes three widely known and disclosed stage molds, the molds comprising a lower stage mold 12, in which the through-hole protrusion 15 is fixed in two columns, a middle stage mold 11, in which the through-holes 15 that is formed in two columns by forming two sheds, or cavities 18, divided by a separating partition 13 are inclined toward the separating partition 13 of the respective shed 18, and a higher stage mold 10, in which a mold protrusion 14 that is inserted through the sheds 18 of the middle mold 11 so as to be placed in parts, where the respective through-hole protrusion 15 formed on the middle mold 12 is not formed.

BRIEF DESCRIPTION OF THE ATTACHED DRAWINGS

A more complete understanding of the invention, and many of the attendant advantages thereof, will be readily apparent by reference to the following detailed description when considered in conjunction with the accompanying drawings in which like reference symbols represent the same or similar components, wherein.

DETAILED DESCRIPTION OF PREFERRED EMBODIMENT

Certain preferred embodiments of the present invention are described in detail in the following.

Figure 1:
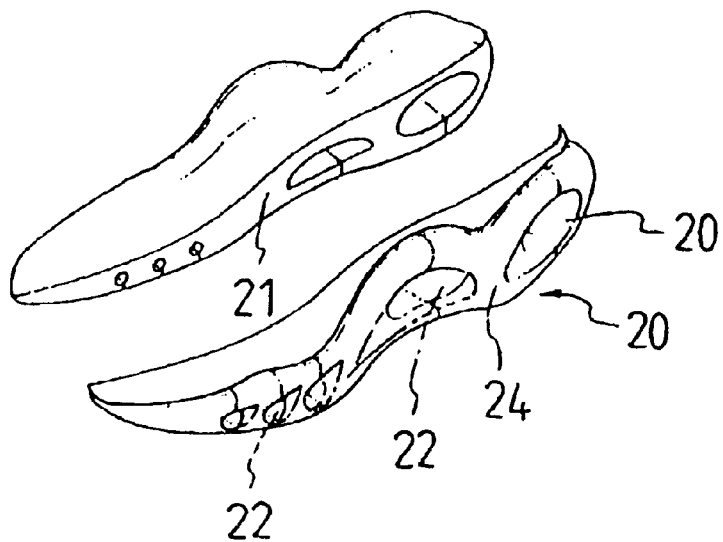
FIG. 1 is a perspective view showing the manufacturing steps of the outer sole of a sports shoe.
Figure 1:
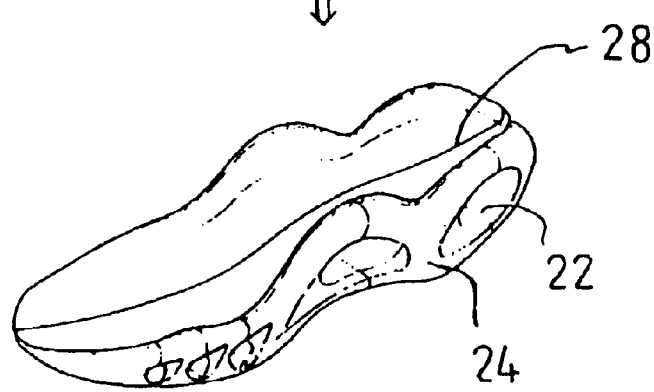
Figure 1:
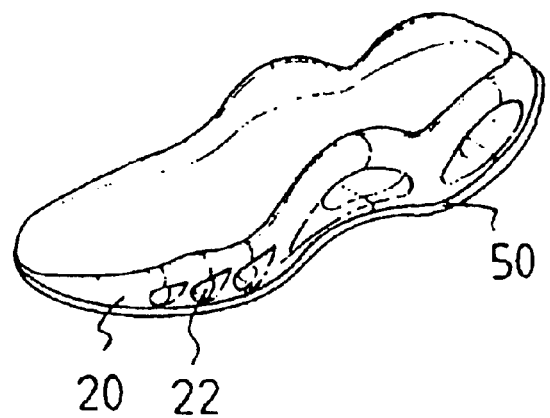

As shown in FIG. 1, one of the embodiments for the manufacturing method of the invention for forming the through-holes in the lateral direction of the midsole is the manufacturing method comprising three steps as described in the following.

In the first step, the left surface and right surface corresponding to the outside lateral surface of the midsole 20 are formed in the respective sections of the lower stage mold 12 and are molded in separate halves. In the second step, the two midsole halves are joined at their corresponding inner surfaces 21. In the third step, the outer sole 50 is attached on the undersurface of the assembled midsole sections.

The reason why the left and right lateral surfaces corresponding to the outer lateral surface are molded in the lower part of the lower stage mold 12 is to achieve a good appearance and aesthetic result in the final assembled shoe and because the through-holes 22 can be reinforced only when the through-holes exposed outwardly on the left and right lateral surfaces corresponding to the outer lateral surface should be widened in the case that the through-holes 22 are formed since the upper stage mold 10 and the middle stage mold 11 can be lifted up.

As a method of glueing the surface 21, there is a way of bonding under
pressure by using an adhesive. Also, as a way of attaching the outer sole 50, there is a way of bonding under pressure by using an adhesive.

Accordingly, it is possible to form the midsole, in which the through-holes are drilled in a lateral direction, in a conventional molding method, since a form is chosen at the time that the midsole 20, which is to be formed, is chosen.

Figure 2:
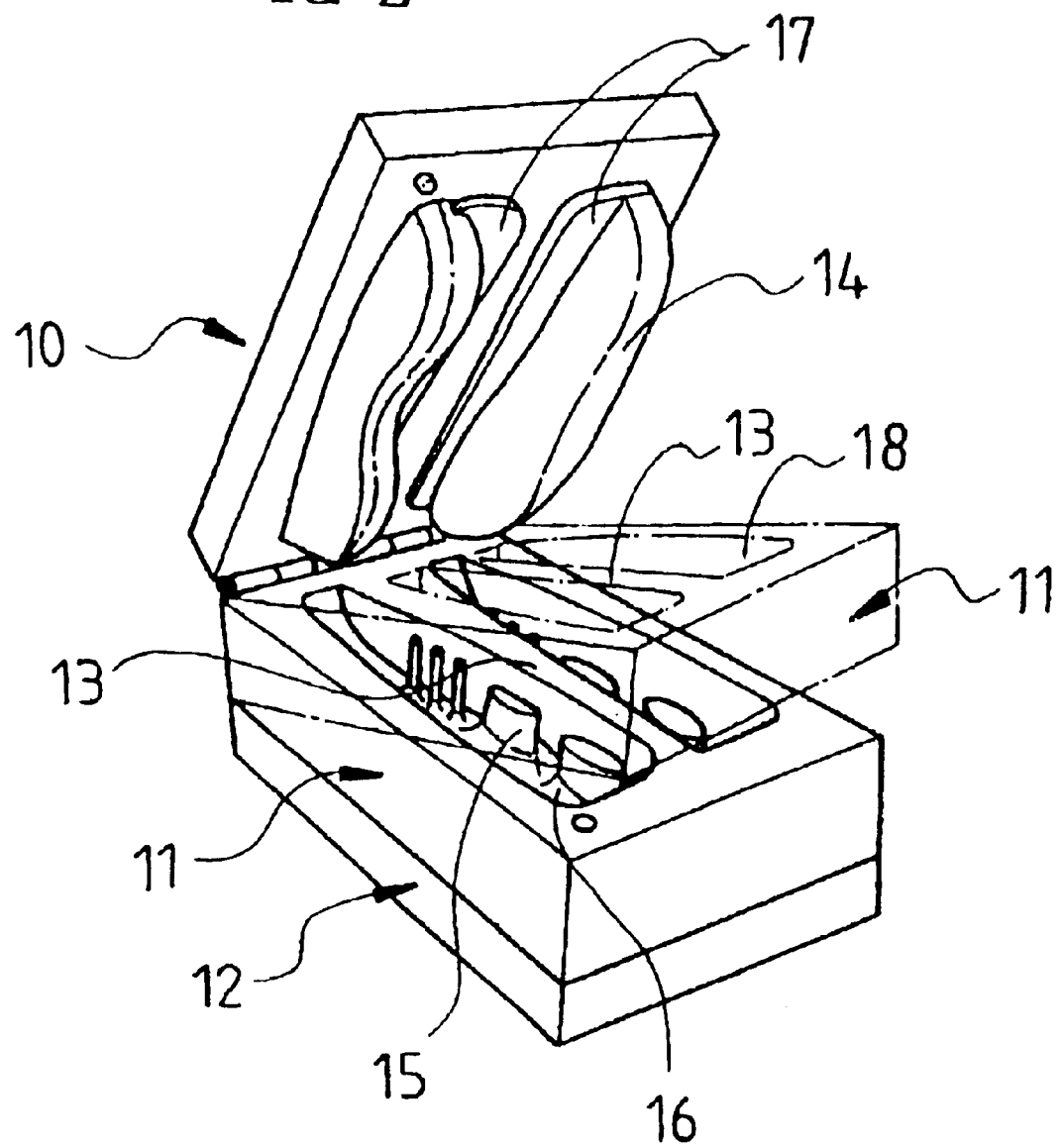
FIG. 2 is a perspective view of a mold for forming the midsole shown in the first step of FIG. 1.

As a molding configuration for forming the midsole 20 which is divided in half, in a widely known and disclosed mold which is constituted with a three stage mold as shown in FIG. 2, the mold configuration has a lower stage mold 12, in which the through-hole protrusion 15, which protrudes selectively according to the position and the shape of the through-holes 22 formed the front edge and the back edge of the midsole 20 so as to be inclined toward a side, is fixed in two columns, a middle stage mold 11, in which the through-holes 15 that is formed in two columns by forming two compartments 18 divided by a separating partition 13: are inclined toward the separating partition 13 of respective compartment 18, and an upper stage mold 10, in which the molding protrusion 14 that is inserted through cavities 18 of the middle mold 11 so as to be placed in parts, is formed at those locations on the middle mold 12 where there are no corresponding through-hole protrusions 15.

The molding protrusion 14 protrudes in an erect state from a lateral surface of the midsole, in order to form the sole of the foot of the midsole 20, which is formed in an injection molding method.

The pressing surface 17, in which the molding protrusion 14 is not formed in the upper stage mold 10, adheres closely to the top surface of the through-holes 15 formed in the lower stage mold 12 when the upper stage mold 10 is closed.

Accordingly, in the mold configured as this, if forming the midsole 20, the respective midsole 20 is formed at the state that the cut surface 21 is symmetrized so as to be formed and is bisected, as shown in FIG. 1, and then, after the cut surfaces of both sides, is glued each other, the outer sole 50 is attached on a bottom of the midsole 20.

Because the through-holes 22, which are drilled in a lateral direction of the midsole, are designed to be widened in an outer lateral surface, the aesthetic appearance of the shoes is high and the restoring force of the through-holes 22 can be maintained. Also it is possible not only to increase the cushioning force of the through-holes 22 since the partition 24 formed between the through-holes 22 plays a roll of reinforcing support, but also to provide goods in a variety of design by transforming the through-hole protrusion 15 in the case of forming the through-holes 22.

Figure 3:
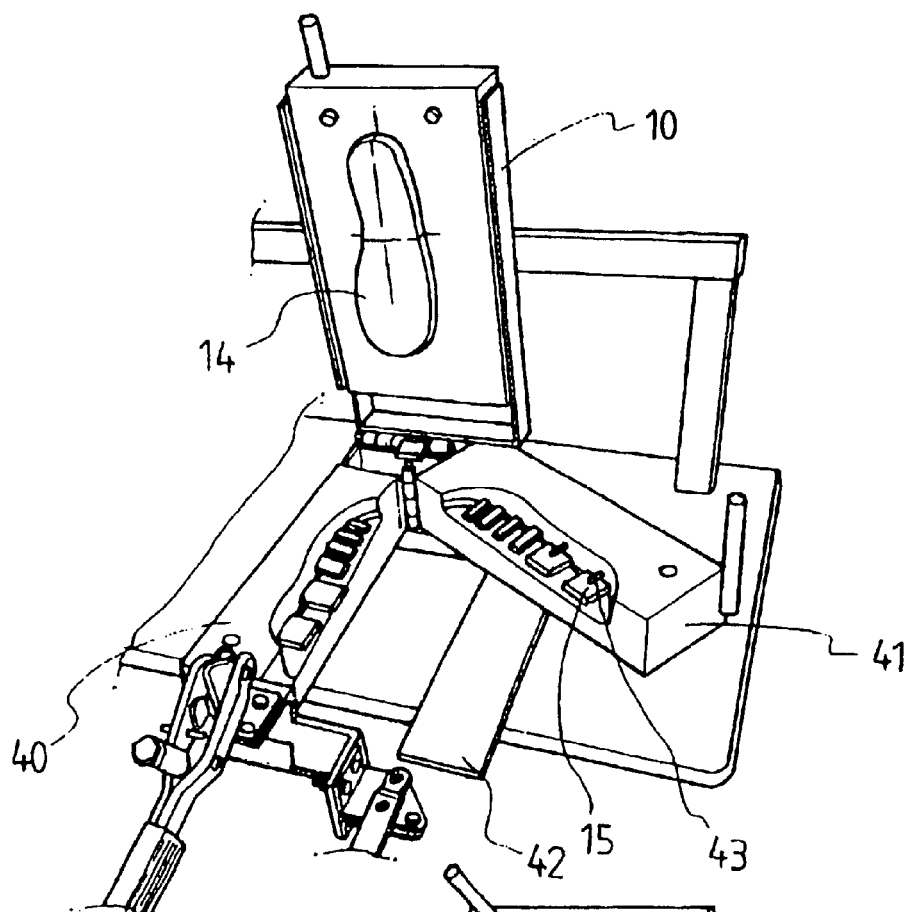
FIG. 3 is a perspective view showing another mold for forming the midsole.
Figure 4:
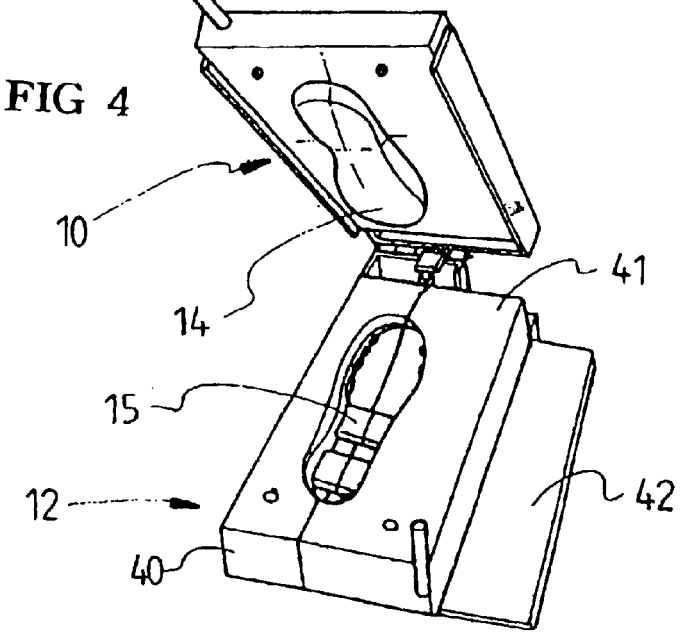
FIG. 4 is a perspective view showing the yet another mold, in which a fixed mold and a moveable mold are closed.
Figure 5:
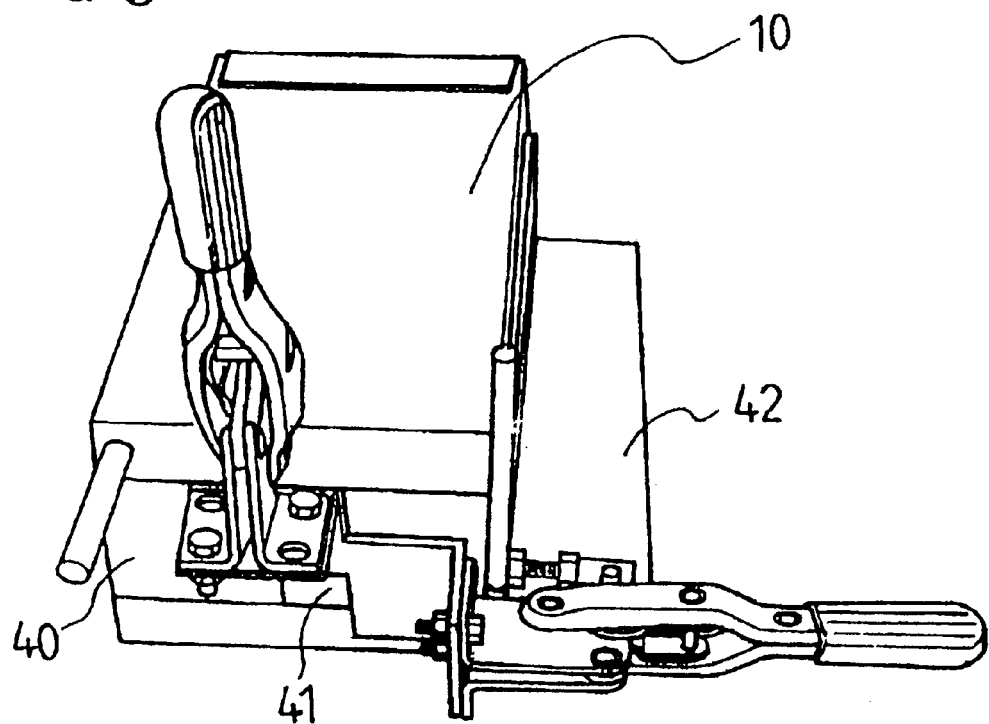
FIG. 5 is a perspective view of the mold of FIG. 3 is closed to form the midsole.
Figure 6:
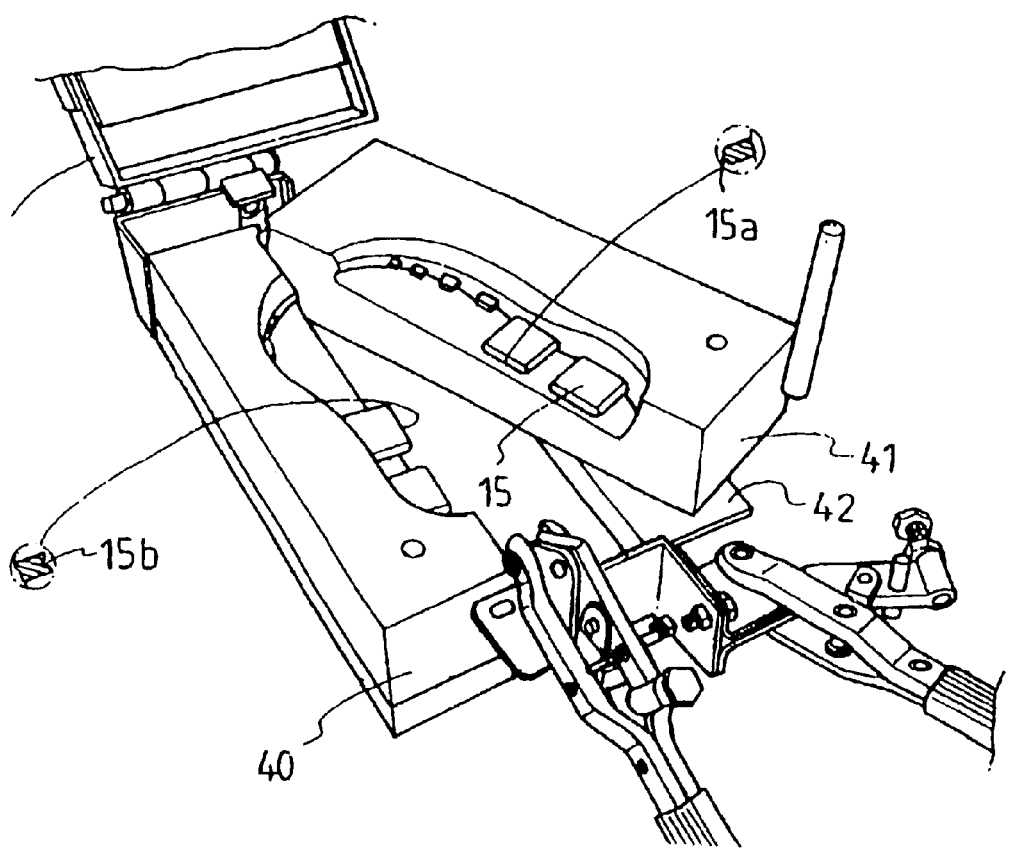
FIG. 6 is a perspective view showing a fixed mold and a moveable mold are opened so as to indicate that an air cushion can be mounted on the front edge of the mold shown in FIG. 3.

Also, in the case that the midsole is not manufactured in two parts, but is integral, the structure of the mold, as shown in FIG. 3 and FIG. 6, is a structure which lifts up the higher stage mold 10, as the mold is divided into two stages, divides the lower stage mold 12 into the fixed mold 40 and the operable mold 41, so that, by making only the operable mold 41 removable in the direction of a side, the midsole 20, in which the through-holes 22 is formed, can be manufactured integrally.

The dies for the through-holes 15 mounted on the fixed mold 40 and the operational mold 41 are designed to be protruding in the lateral direction at the position that it is fixed on the lateral surface, and the dies for the through-holes 15 formed on the fixed mold 40 and the operational mold 41 are designed to be geared with each other. At this time, as a method of being geared, there is a method, in which the front edge of the through-protrusion 15 comes in contact with each other, and the method, in which the front edge is inserted and combined because of the protrusion 15a and the essential input part 15b.

The dies for the through-holes 15 are formed on the center of the lateral surface in the case where it is formed on the lateral surface of the fixed mold 40 and the operational mold 41 and, in the higher stage mold, the forming protrusion 14 protrudes on the plane in order to form the sole of the foot in the midsole 20 on its upper surface.

Also, in the case that the dies for the through-holes 15 are formed only on the fixed mold 40 of the lower stage mold 12, even though there is a difficulty in ejecting the formed midsole 20, it is possible to pull out easily even small shoes, such as baby shoes, in which the width of the midsole is narrow.

Also, in the case that the operational mold 41 is pulled out in the lateral direction, as it goes down due to the weight of the operational mold 41 itself, in the case that the molds are required to be rejoined, in order to prevent the die for the through-hole 15 from not coming in contact with each other, a guide support plate 42 is formed in a fixed width on the place where the operational mold sinks.

In the case that the through-holes 22 of the midsole 20, which is formed by the die for the through-hole 15, is greatly formed, the air cushion 23 can be mounted only on the upper surface of the through-holes 22 in the midsole 20 at the time of forming by forming the fixed pin 43 into a side of the through-hole protrusion and inserting to fix the air cushion 23 between the fixed pin 43 and the through-hole protrusion 15 so that the air cushion 23 may be mounted on the top surface of the through-holes 22 in order to restore the cushion completely. Also, at this time, instead of the air cushion 23, the curved elastic plate 23a can alternatively be mounted.

Also, the air cushion 23 can be mounted on the center of the through-hole, in which it is passed on the front edge, at the time of forming it by fixing air cushion 23 in the case that the operational mold 41 is shut up, and by placing the air cushion 23 on the through-hole protrusion 15c, with the through-holes 15 not being attached closely, on the front edge, in which the die for the through-hole 15 is formed, in the case that the fixed mold and the operational mold 41 are.

Figure 7:
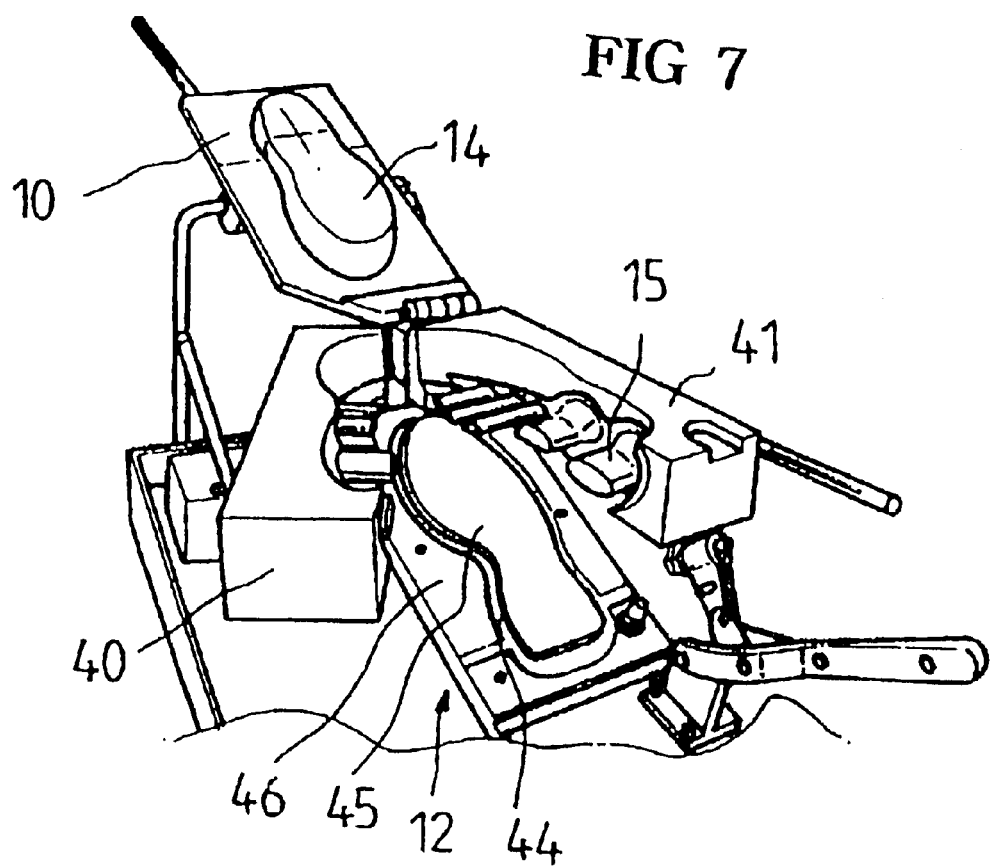
FIG. 7 is a perspective view showing the configuration state of another mold for forming the midsole.
Figure 8:
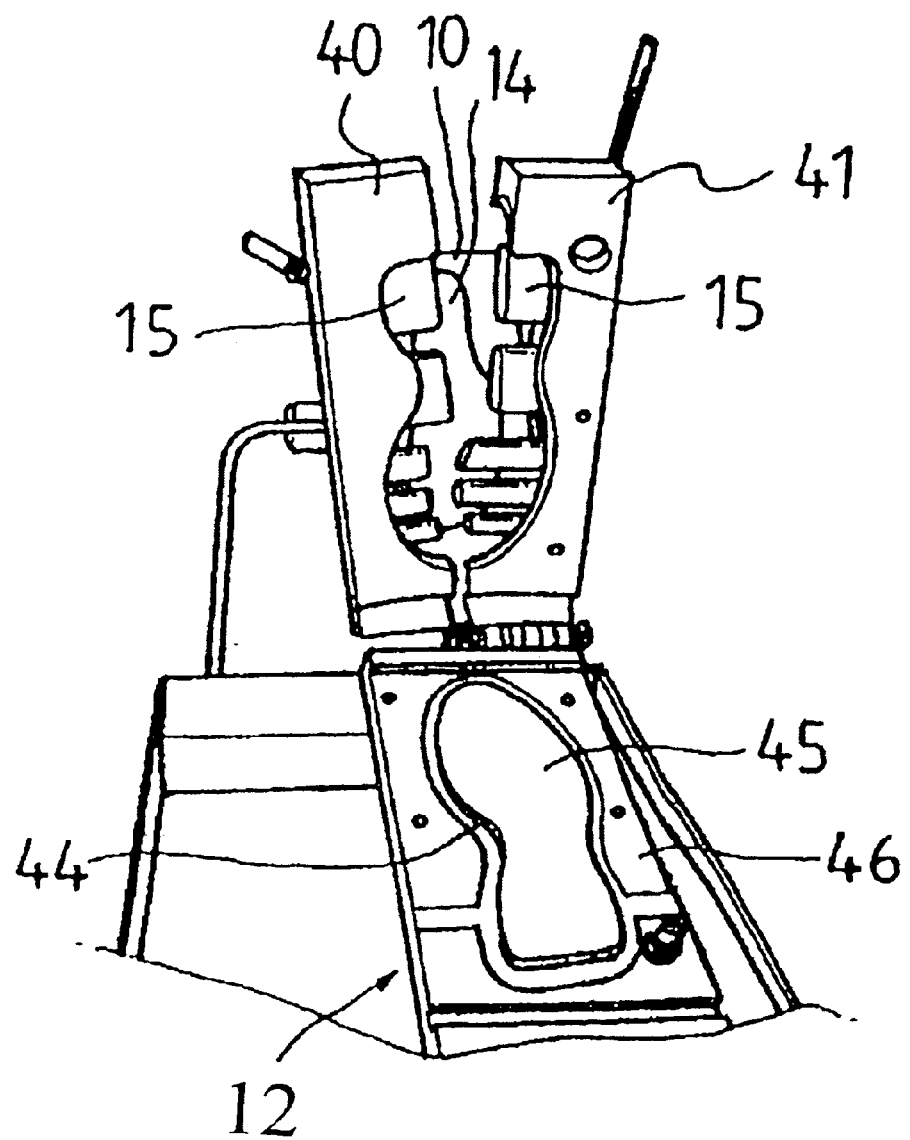
FIG. 8 is a perspective view showing the state, in which the middle stage mold of FIG. 7 is lifted.
Figure 9:
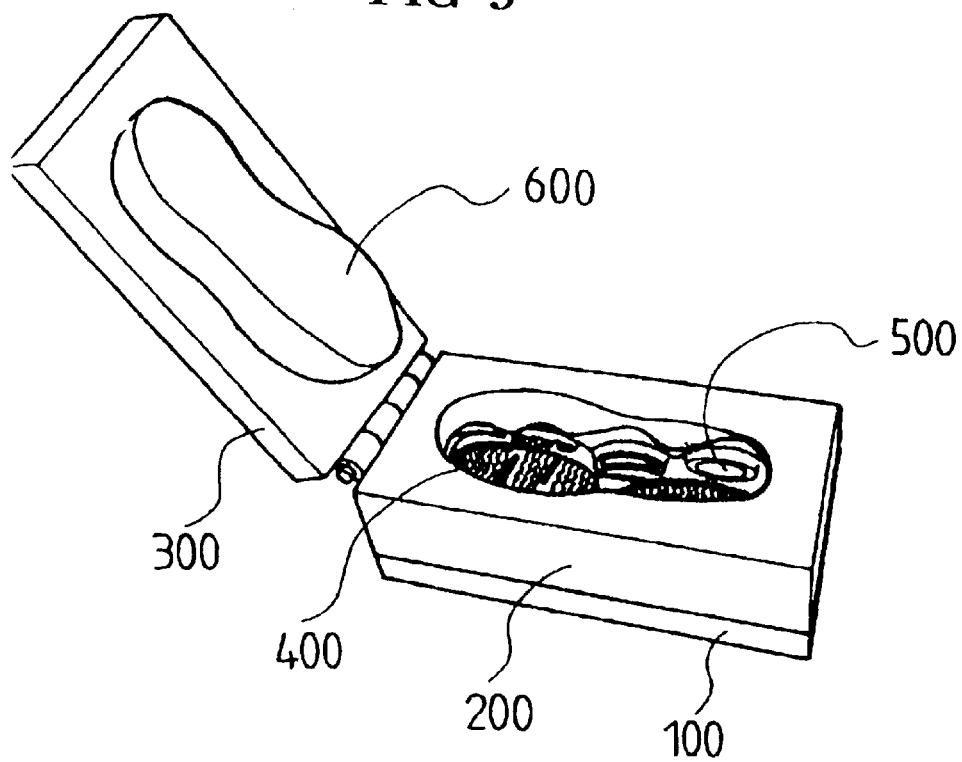
FIG. 9 is a perspective view showing the structure of the mold, in which a conventional midsole is formed.

Also as the right an left sides of the middle stage mold 11 are widened 11 by three stage molds as shown in FIG. 7 and FIG. 8, the coupling line 28 can be designed not to be indicated on the midsole 20.

For this, a mold, in which a coupling line or joint seam 28 is not desired on the formed midsole 20, wherein the middle stage mold, in which a fixed space is formed so that the molding protrusion 14 of higher stage mold 10 may be inserted, is divided into the left-sided middle stage mold 40 and the right-sided middle stage mold 41, and is removed so that it may be widened into the left and the right directions and the respective through-protrusion 15 is protruding in the side direction of the left middle stage mold 40 and the right middle stage mold 41 and, in the case that the left-sided middle stage mold 40 and the right-sided middle stage mold 41, in which the respective through-protrusion 15 is formed, are opened and then shut, so that it may be gathered in the exact position; and in the case that the left-sided middle stage mold 40 and the right-sided middle stage mold 41 are gathered by forming the higher side protrusion 45, in which a protrusion jaw 44 is formed on the lower stage mold 12, so that it may be adhering exactly by the protrusion jaw 44 and the support surface 46 having a fixed width may be formed in order to maintain the left and the right balance at time of adherence.

Also, the midsole manufactured as the above can form the through-holes so as to have a fixed diameter and shape normally on the front edge and the back edge, but, in the case that these the through-holes are formed, the partition 24, which is made between the through-holes 22 and the through-holes 22, can have an increased cushioning effect and can maintain a restoring force according to the position of the through-hole and the partition 24 when a user wears the shoe and walks in it.

Figure 10:
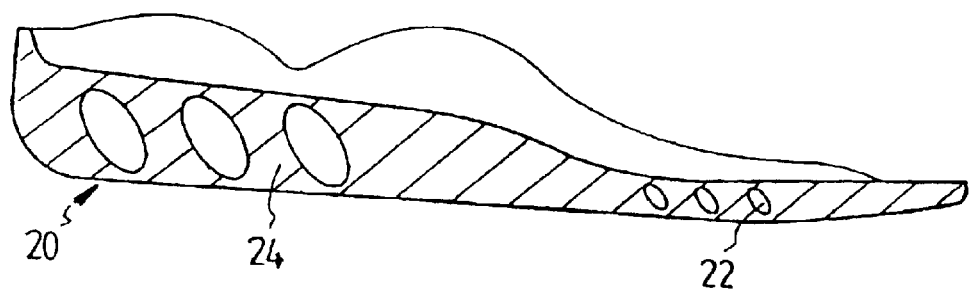
FIG. 10 is a cross sectional view of the through-holes of the midsole formed on a slant.

Also, the shape of the through-holes 22 in the midsole 20 which is formed in a shooting method as shown in FIG. 10 is slanted in the front direction and formed to be slanted in the back direction, so that it is possible to achieve the increased cushioning effect and restoring force as well.

Figure 11:
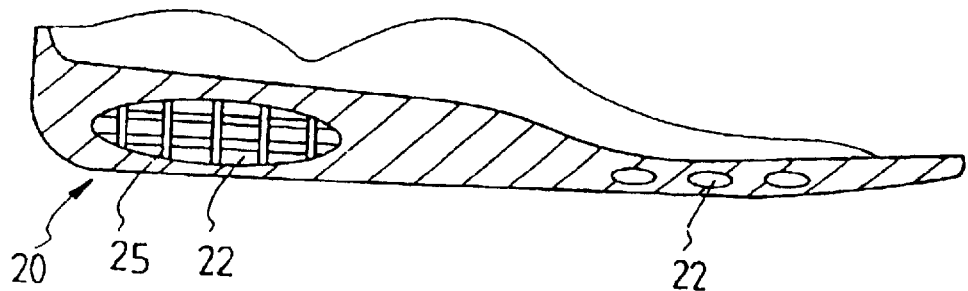
FIG. 11 is a cross sectional view of a latticed support in the through-holes of the midsole.
Figure 12:
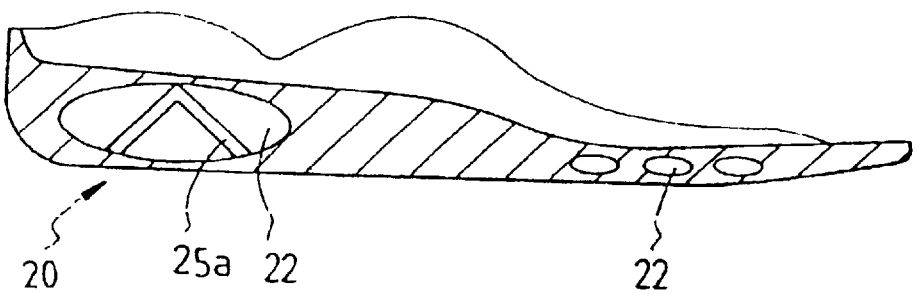
FIG. 12 is a cross sectional view of a three legged support formed into the through-holes of the midsole.
Figure 13:
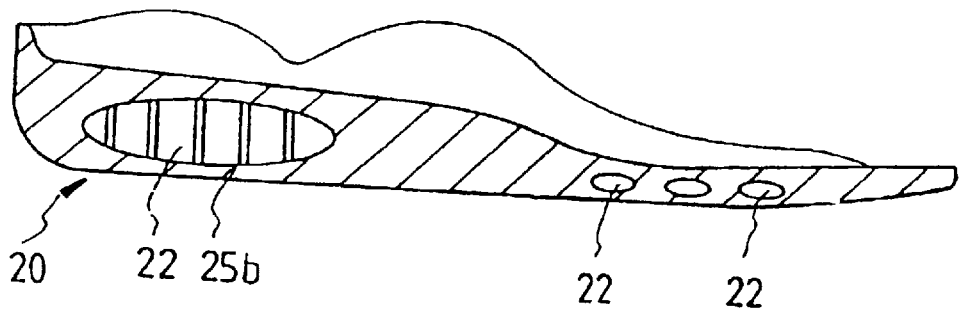
FIG. 13 is a cross sectional view of a vertical support formed into the through-holes of the midsole.

Also, as shown in FIG. 11, not only it is possible to increase the cushion but also to prevent alien substance from being inserted by allowing a large the through-hole 22 to be formed on the back edge of the midsole 20 so as to form the latticed support 25. Also, as shown in FIG. 12, the cushion can be reinforced by forming a triangle area 25a on the great through-holes 22. Also as shown in FIG. 13, in the case that a vertical support 25b is formed on the large through-holes 22, it is possible to make goods having diversified designs, which can increase a restoring force as well as which can increase the cushioning force.

Figure 14:
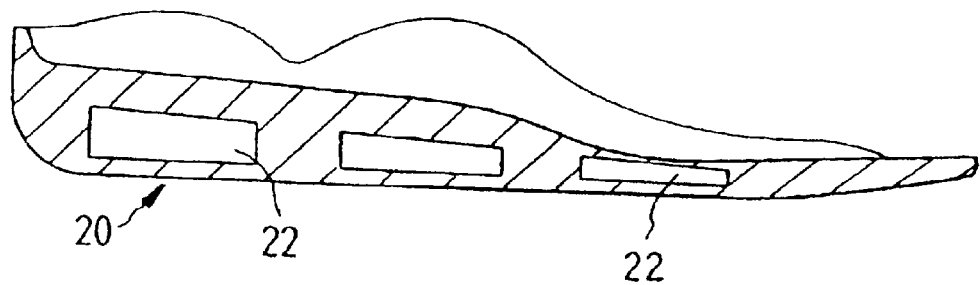
FIG. 14 is a cross sectional view of completely-formed through-holes of the midsole.

Also as shown in FIG. 14, the width of a through-hole 22 increases as pressure is applied to the shoe, compressing the through-hole, and decreases when pressure is removed. Through-holes 22 of various widths can be utilized over different portions of the lateral surfaces of the midsole 20 to differentiate both the appearance and cushioning effect of the holes from soles having uniform sized through-holes. If the shape of the through-holes 22 is to be maintained horizontally on the bottom surface which comes in contact with the ground the through-holes should be slanted upwardly on the sole of the foot, and they will also maintain the same cushioning effect. In this embodiment, the shape of the through-hole is shown as an angled shape, but the through-holes can alternatively be made as a round shape.

Figure 15:
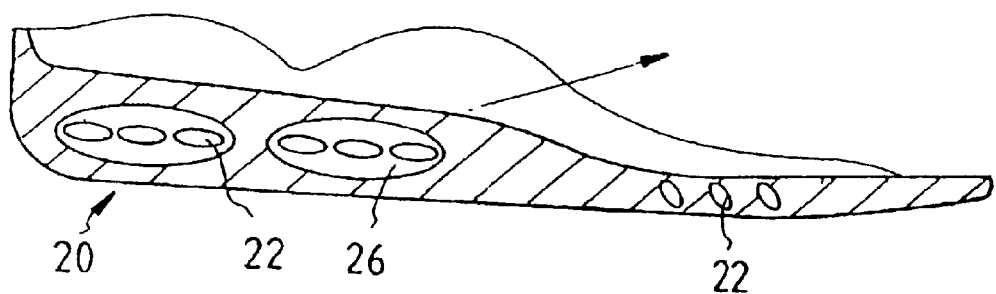
FIG. 15 is a cross sectional view of a plurality of the through-holes on the midsole formed in a single main groove.
Figure 16:
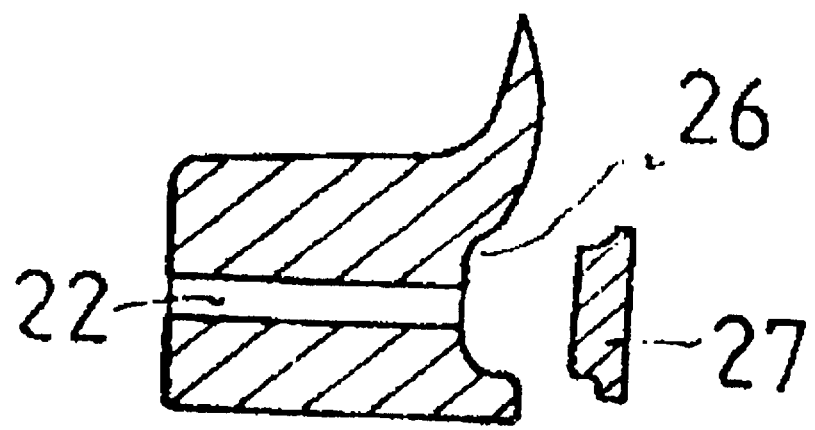
FIG. 16 is a cross sectional view of a plurality of the through-holes on the midsole formed into a single main groove, and are covered with a stopper.

Also, as shown in FIG. 15, the aesthetic appearance of the shoes is enhanced by forming small through holes which gather several through-holes 22 in a fixed appearance and forming these tiny the through-holes 22 into inside of the essential input groove 26 which is grooved in a fixed size and a stopper 27 can be used on this essential input groove 26 as shown in FIG. 16.

In the case where stoppers 27 are formed, in order to prevent foreign substances from being inserted into the through-holes 22, stoppers 27 can be formed for all the through-holes 22.

Figure 17:
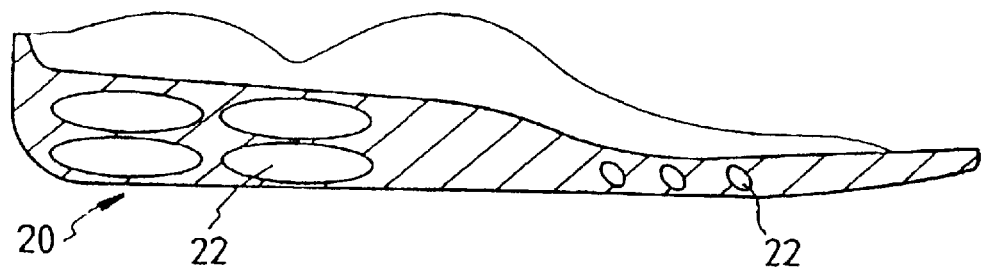
FIG. 17 is a cross sectional view of the through-holes of the midsole are formed into two levels.
Figure 18:
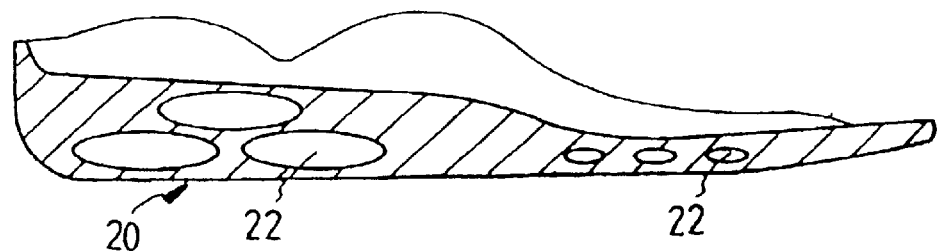
FIG. 18 is a cross sectional view of through-holes of the midsole formed into a zigzag pattern.

Also, the through-holes 22, as shown in FIG. 17, form the back edge in a multi layer as shown in FIG. 17, or the through-holes 22 can be multilayered in order to be placed in a zigzagged pattern as shown in FIG. 18.

Figure 19:
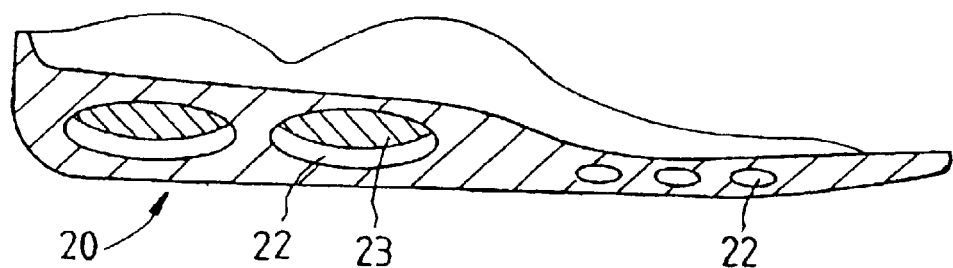
FIG. 19 is a cross sectional view of an air cushion mounted upwardly into the through-holes of the midsole.
Figure 20:
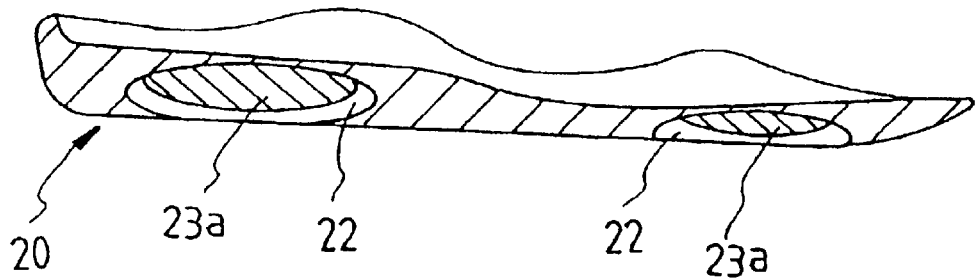
FIG. 20 is a cross sectional view of a curved elastic plate is mounted upwardly into the through-holes of the midsole.

By mounting the air cushion 23 on the upper side of the through-holes 22, as shown in FIG. 19, while walking, the restoring force can be increased by the added cushioning effect of the air cushion 23. Also, the elastic plate 23a which is curved as a substitute of the air cushion 23 can be mounted as shown in FIG. 23.

Figure 21:
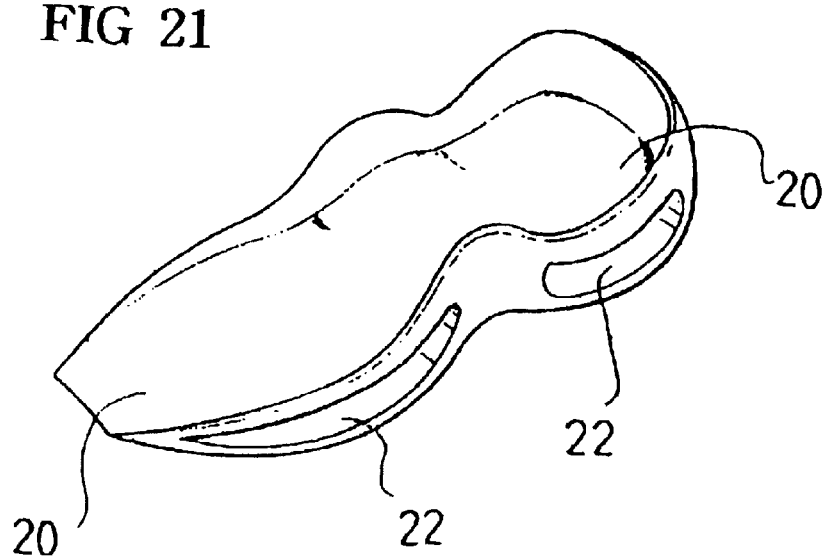
FIG. 21 is a perspective view of the through-holes of the midsole passed completely through the front edge and the back edge.
Figure 22:
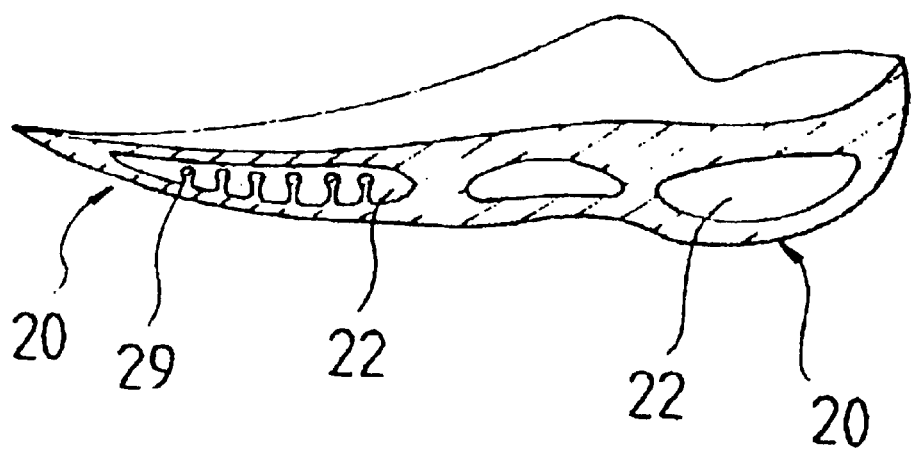
FIG. 22 is a cross sectional view of a plurality of thin erect protrusions are formed into the through-holes of the front edge on the midsole.

Also, the through-holes 22, as shown in FIG. 21, can be used by passing through the entire parts of the front edge and the back edge. The thin erect protrusions 29 can be formed on the through-holes of the front edge as shown in FIG. 22.

Figure 23:
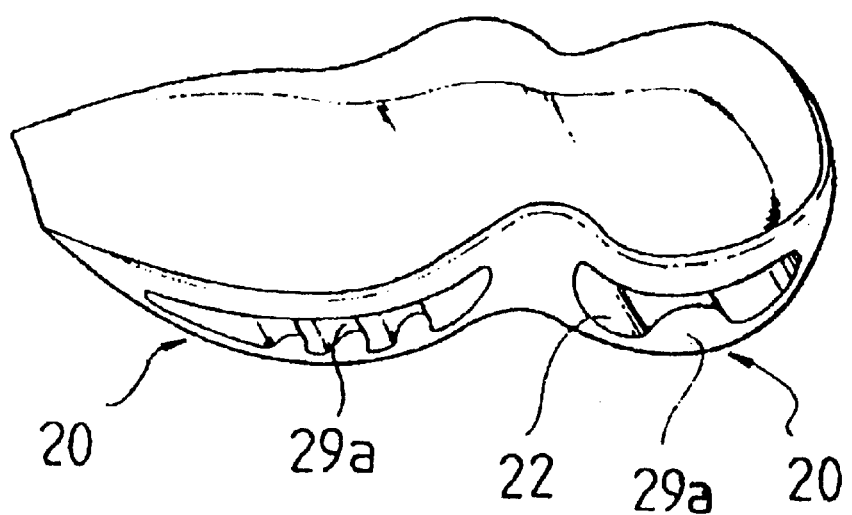
FIG. 23 is a perspective view of the curved protrusion formed into the through-holes of the midsole.
Figure 24:
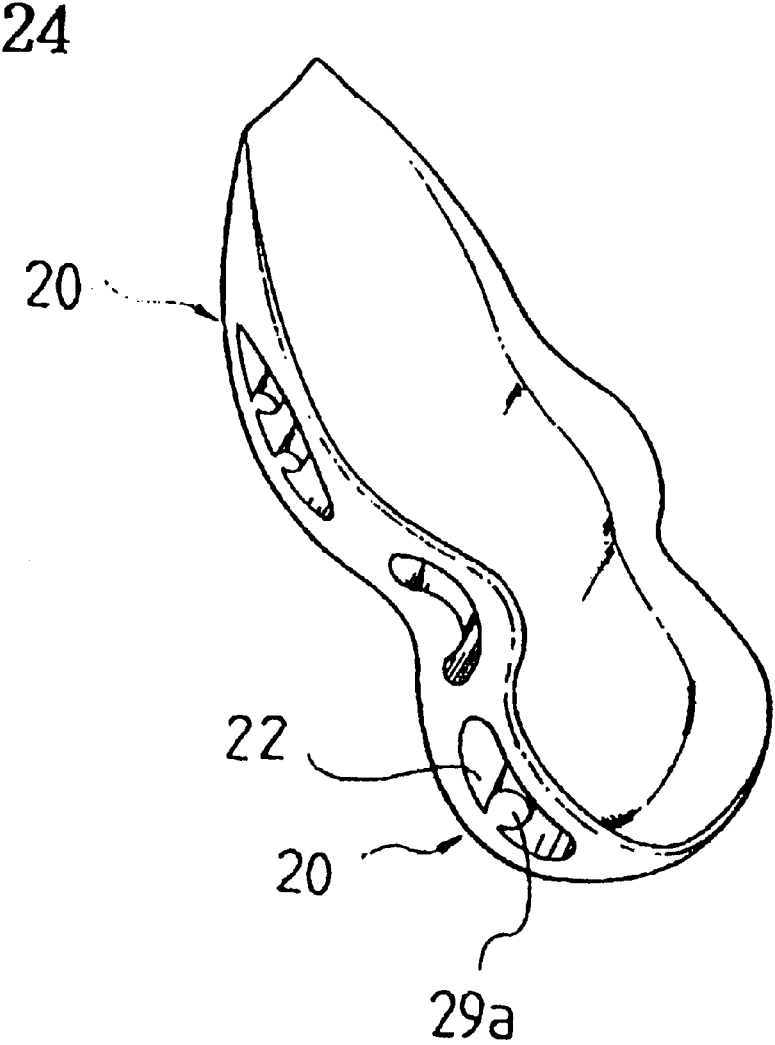
FIG. 24 is a perspective view showing another shape of the curved protrusion.
Figure 25:
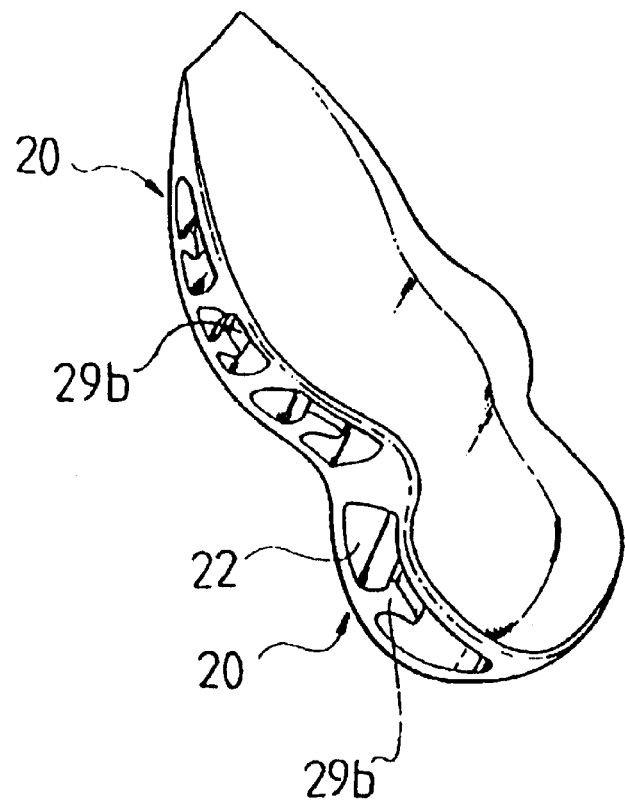
FIG. 25 is a perspective view of a supporting protrusion formed on the through-holes of the midsole.

The curved protrusions 29a, which are different in size, can be formed as shown in FIG. 23 and FIG. 24. Also, the supporting protrusions 29b can be formed as shown in FIG. 25 In the above the through-holes, a filler which has good cushioning capability can be filled and the elastic tube made in tube type cane inserted for protecting the through-holes.

Figure 26:
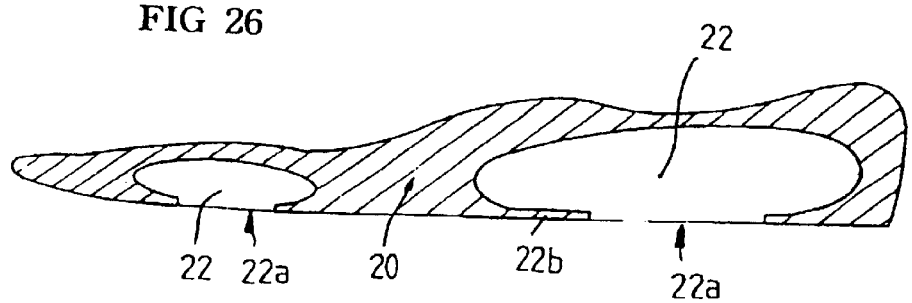
FIG. 26 is a cross sectional view of a cavity formed, in which a lateral part of the through-holes on the midsole is incised.
Figure 27:
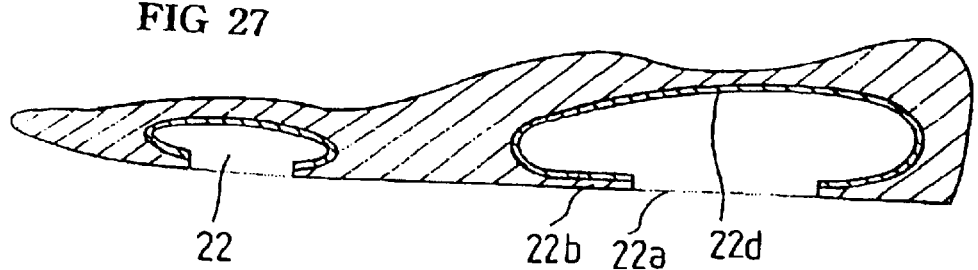
FIG. 27 is a cross sectional view of a supporting structure inserted in the cavity.
Figure 28:
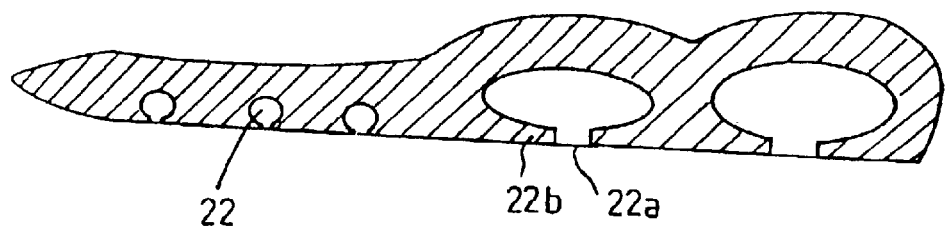
FIG. 28 is a cross sectional view, in which another shape of the cavity is indicated.
Figure 29:
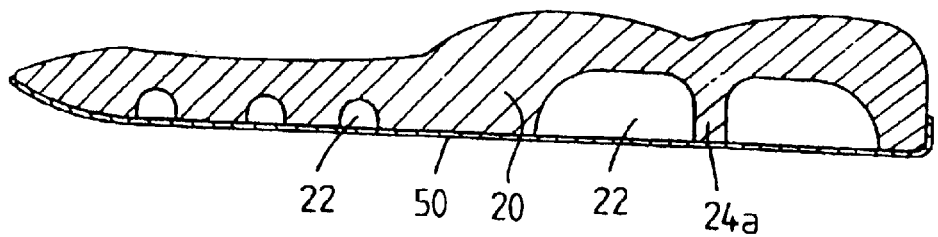
FIG. 29 is a cross sectional view, in which the outer sole is attached to the cavity of the midsole.

Also, as shown in FIG. 26 and FIG. 28, the lower surface of the midsole 20 is cut and a cavity 22a is formed. The cavity 22a forms the support 22b so that it may be supported. In the case that the support 22b is not formed, as shown in FIG. 29, cushioning force can be increased by glueing the outer sole 50 and the supporting structure 23b can be formed inside of the through-hole 22, in which a shed 22a is formed.

Figure 30:
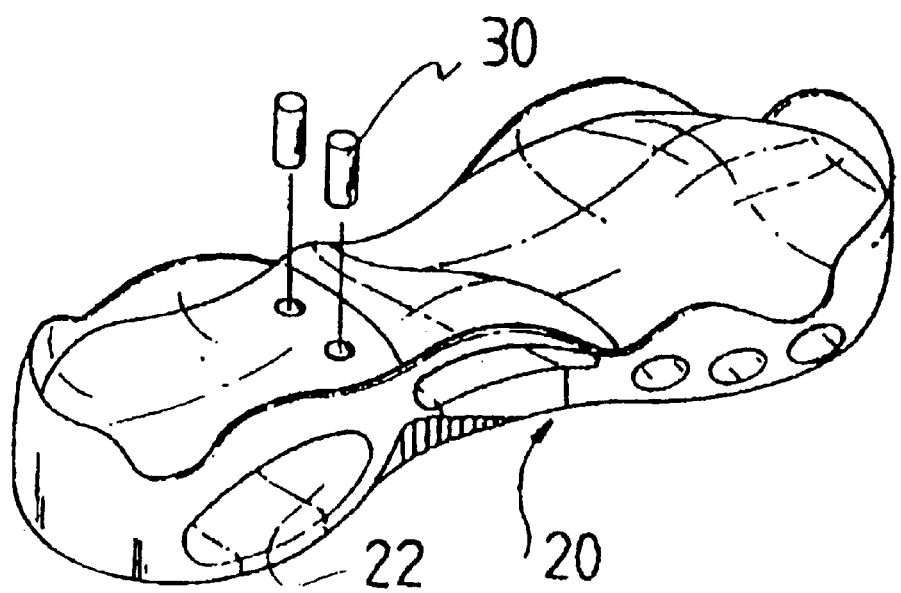
FIG. 30 is a perspective view of the state, in which an elastic bar is formed for reinforcing the through-holes of the midsole.
Figure 31:
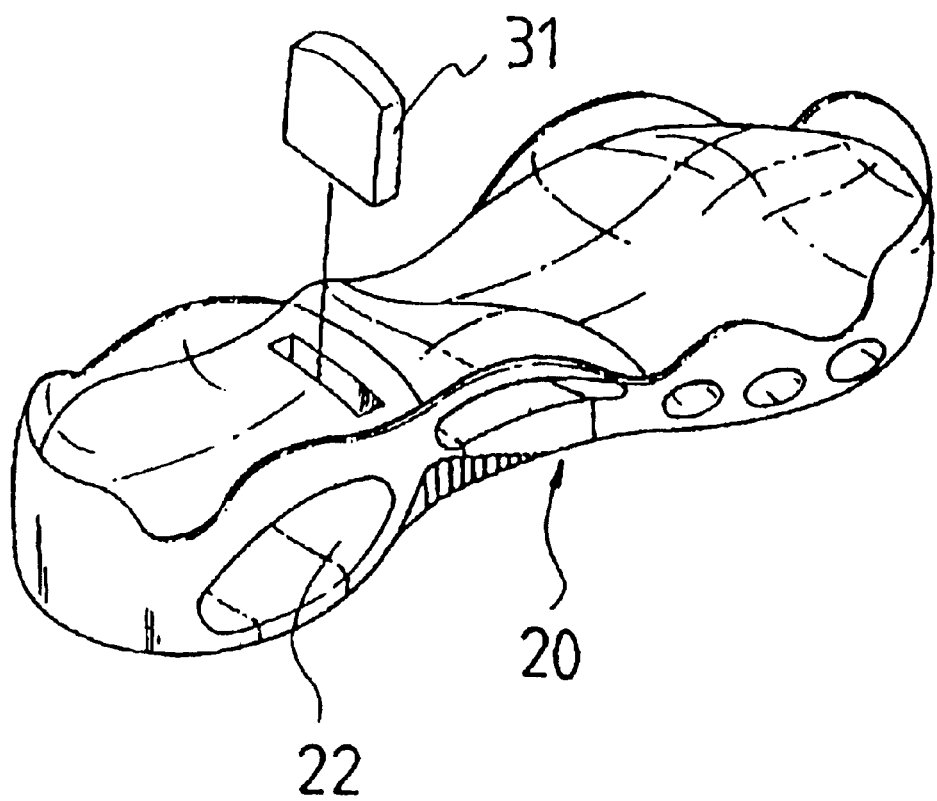
FIG. 31 is a perspective view of the state, in which an elastic bar is formed for reinforcing the through-holes of the midsole.
Figure 32:
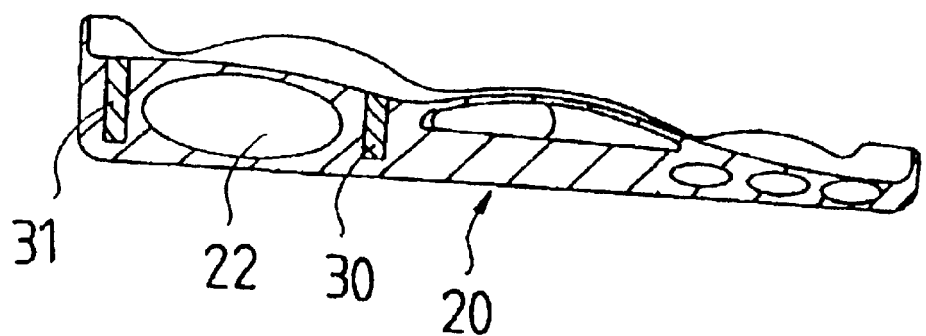
FIG. 32 is a cross sectional view showing the state, in which the elastic plate is mounted in the front or the back position of the through-hole in the midsole.

Also, as shown in FIG. 30 and FIG. 32, by placing the elastic plate 31 or the elastic bar 30 in the front or the back of the through-hole 22, the elastic force of the through-hole 22 will be protected.

Also, in order to form the through-hole on the midsole, the through-holes can be formed by inserting and glueing a shed which is formed in the midsole.

Accordingly, it will be an effect that cushions can be increased by the elastic force of the through-hole due to the through-hole, which is passed through the lateral direction of the midsole. Another effect is that the partition is endowed with the restoring force by cushion because of the through-holes which are holes. Another further effect will be not only increasing the cushion because of the through-holes, but also preventing a foot from being cold because the foot is separated from the ground because of the reinforcing support and the through-holes even in the case that a user stands on the ice or snow at the state that he wears the shoes. still, another effect will be that a user can use shoes which give him a refreshing feeling because the shoes can be separated from the hot ground due to radiant heat during a summer season.

Finally, if the through-holes which are passed through the lateral direction of the midsole are formed according to this invention, it is possible to increase the cushioning effect of, and to reduce the weight of, the shoes. Also, it is possible to manufacture the shoes easily because of the improvement of the manufacturing step and the development of molds for forming the through-holes. Also, due to the improvement of the manufacturing step and the development of molds for making the through-holes, the outer sole for a variety of sports shoes can be provided.

It will be apparent to those skilled in the art that various modifications can be made in the outer soles of the present invention, without departing from the spirit of the invention. Thus, it is intended that the present invention covers such modifications as well as variations thereof, within the scope of the appended claims and their equivalents.

What is claimed is:

1. Shoe outer sole comprising:
   a shoe midsole,
      having right, left, front and back portions,
      said shoe midsole being formed from corresponding mirror-image injection-molded opposite right and left midsole pieces,
      respective right and left midsole pieces being provided for each of a right and a left shoe,
      each said right and left midsole piece for both said right and left shoes having an outer lateral surface, an inner lateral surface, and a bottom surface,
      said outer lateral surface and said inner lateral surface both being oriented in substantially vertical planes, substantially perpendicular to said bottom surface, which is oriented in a horizontal plane; and
   a plurality of through-holes in said shoe midsole,
      said through-holes correspondingly distributed longitudinally along at least a portion of each said right and left midsole piece for both said right and left shoes, extending from a front toe portion to a rear heel portion of each said respective right and left midsole piece,
      said through-holes fully extending laterally, in a direction transverse to longitudinal axes of said right and left midsole pieces, from said outer lateral surface of each said respective right and left midsole piece, said outer lateral surfaces having a curvilinear contour of respective right and left outer half footprints, to said inner lateral surface of each said respective right and left midsole piece, such that said inner lateral surfaces have a contour compatible with a corresponding contour of a respective opposite right or left midsole piece, said corresponding respective right and left midsole pieces for both said right and left shoes being irreversibly conjoined along their respective inner lateral surfaces, to form a monolithic shoe midsole, respectively for each of said right and left shoes, wherein said through-holes of said respective right and left midsole pieces of said conjoined monolithic shoe midsole positionally correspond with one another linearly along a common longitudinal axis of said conjoined monolithic shoe midsole, such that longitudinally corresponding ones of said through-holes of both said right and left midsole pieces of each of said right and left shoes align with one another at their corresponding inner lateral surfaces, and communicate with each other to form through-holes fully extending from said outer lateral surface of said right midsole piece through to said outer lateral surface edge of said left midsole piece for both said right and left shoes, when said respective right and left midsole pieces of each shoe are conjoined to form their respective shoe midsole; and a monolithic bottom outsole piece joined to said bottom surfaces of said right and left midsole pieces of said conjoined monolithic shoe midsole for each of said right and left shoes;

with each of said right and left midsole pieces of both said right and left shoes being of an elastic material having a compressability and restorative resiliency under a pressure up to a weight of a wearer of said shoes, such that said through-holes are deformable from an unstressed shape to provide a cushioning effect to said outer soles of said shoes when a compressive, deforming pressure is exerted thereon, and said through-holes return to their unstressed shape when said compressive pressure is removed.

2. Shoe outersole according to claim 1, wherein a support is formed in at least certain through holes of said misdole in order to provide a restorative capability to said through holes bearing said vertical supports, when said through holes are subjected to a compressive, deforming pressure.

3. Shoe outersole according to claim 2, wherein said support is at least one vertical post.

4. Shoe outersole according to claim 3, wherein there is a plurality of vertical posts.

5. Shoe outersole according to claim 2, wherein said support is an inverted V-shaped element.

6. Shoe outersole according to claim 2, wherein said support is a lattice of vertical and horizontal elements.

7. Shoe outersole according to claim 1, wherein stoppers are located on at least certain through holes of said misdole, to prevent entrance of foreign matter into said through holes provided with said stoppers, in order to prevent foreign matter from attenuating cushioning capability provided by said through holes.

8. Shoe outersole according to claim 1, wherein one of: a plurality of elastic plates and an elastic bar, is formed in one of: a front and a back of said through holes of said midsole.

9. Shoe outersole according to claim 1, wherein erect protrusions are formed in said through holes of said midsole.

10. Shoe outer sole according to claim 1, wherein said through-holes on both said right and left said midsole pieces of both said right and left shoes are at least one of: different sizes, different shapes; different orientations; and are arranged in patterns.

11. Shoe outer sole according to claim 10, wherein said through-holes on both said right and left midsole pieces of both said right and left shoes all are the same shape, but are different sizes.

12. Shoe outer sole according to claim 10, wherein said through-holes on both said right and left midsole pieces of both said right and left shoes are different shapes, all of which have an equal cross-sectional area.

13. Shoe outer sole according to claim 10, wherein said through-holes on both said right and left midsole pieces of both said right and left shoes are at least one of: at least two different shapes; and at least two different sizes.

14. Shoe outer sole according to claim 10, wherein said through-holes on both said right and left midsole pieces of both said right and left shoes are different shapes and different sizes, at least certain of said through-holes are oriented differently with respect to one another, and at least certain of said through holes are arranged in a pattern.

15. Shoe outer sole according to claim 10, wherein said through-holes on both said right and left midsole pieces of both said right and left shoes are all of the same size and shape.

16. Shoe outer sole according to claim 10, wherein said through-holes on both said right and left midsole pieces of both said right and left shoes are of the same shape, and at least certain of said through-holes on each of said right and left midsole pieces are oriented differently with respect to other through holes on each of said same respective right and left midsole piece.

17. Shoe outer sole according to claim 10, wherein at least some of said through-holes on both said right and left midsole pieces of both said right and left shoes are in at least one of: multiple rows, and multiple columns.

18. Shoe outer sole according to claim 17, wherein there are multiple rows and multiple columns of said through-holes.

19. Shoe outer sole according to claim 18, wherein there are two rows of through-holes.

20. Shoe outer sole according to claim 19, wherein each of said two rows of through-holes has at least two columns of through-holes.

21. Shoe outer sole according to claim 20, wherein said at least two columns of through-holes of said two rows are aligned non-vertically.

22. Shoe outer sole according to claim 21, wherein said at least two columns are aligned staggered with respect to one another.

23. Shoe outer sole according to claim 22, wherein said at least two columns are aligned on a diagonal to one another.

24. Shoe outersole according to claim 10, wherein the cushioning ability of a through hole is a function of its said size, shape, and orientation.

25. Shoe outersole according to claim 1, wherein at least certain of said through holes are reinforced with a reinforcing tube, which reinforcing tube is one of: resistive to crushing deformation, and resilient upon deformation, so as to maintain cushioning capability of said through holes bearing said reinforcing tubes.

26. Shoe outersole according to claim 1, wherein at least certain of said through holes are formed in said right and left midsole pieces of said right and left shoes such that those said through holes are adjacent to and in communication with an outside of said bottom surface of said respective midsole piece, such that those said through holes form an open cavity in said respective midsole pieces.

27. Shoe outersole according to claim 26, wherein said through holes adjacent to and in communication with said outside of said bottom surface of said midsole pieces and forming an open cavity in said respective midsole pieces, are enclosed by and when said bottom outsole piece is attached to said outside surface of said midsole pieces.

28. Shoe outersole according to claim 1, wherein a plurality of through holes are clustered together in a common groove in said midsole pieces.

29. Shoe outersole according to claim 1, further comprising at least one separate air-filled cushion in at least one of said through holes.

30. Shoe outersole according to claim 1, wherein at least certain of said through holes are formed such that there is at least one protrusion of material of said midsole piece in which said through hole is formed, said at least one protrusion extending vertically upward from a lower portion of said midsole piece in which said through hole is located, and into a volume of said through hole, so as to at least incompletely compartmentalize said through hole and provide vertical support for resisting deformation of said through hole when it is subjected to a compressive, deforming pressure, and for restoring cushioning capability of said through hole when said compressive, deforming pressure is removed.

31. Shoe outer sole according to claim 1, wherein at least certain of said through holes are interconnected with one another.

* * * * *